United States Patent [19]

Armstrong

[11] Patent Number: 4,516,216

[45] Date of Patent: May 7, 1985

[54] IN-SERVICE MONITORING SYSTEM FOR DATA COMMUNICATIONS NETWORK

[75] Inventor: Thomas R. Armstrong, Largo, Fla.

[73] Assignee: Paradyne Corporation, Largo, Fla.

[21] Appl. No.: 376,741

[22] Filed: May 10, 1982

Related U.S. Application Data

[63] Continuation of Ser. No. 230,456, Feb. 2, 1981, abandoned, which is a continuation of Ser. No. 17,042, Mar. 2, 1979, abandoned.

[51] Int. Cl.³ .............................................. H04B 3/14
[52] U.S. Cl. ....................................... 364/514; 375/39
[58] Field of Search ..................... 375/10, 14, 15, 39; 364/200, 900, 514

[56] References Cited

U.S. PATENT DOCUMENTS 3,971,996  7/1976  Motley et al. ................. 375/39 X Primary Examiner—Edward J. Wise
Attorney, Agent, or Firm—Kane, Dalsimer, Kane, Sullivan & Kurucz

[57] ABSTRACT

A data communications network is provided in which communications equipment at separated locations are provided with auxiliary processing equipment. The communications equipment is interfaced with the auxiliary processing equipment by means of an analog interface, digital interface and a high speed data bus. The auxiliary processing equipment permits the non-interfering monitoring of the status of the entire network including the communications equipment, data terminal connected to the communications equipment and communications media interconnecting the communications equipment.

5 Claims, 11 Drawing Figures

IN-SERVICE MONITORING SYSTEM FOR DATA COMMUNICATIONS NETWORK

This is a continuation of application Ser. No. 230,456, filed Feb. 2, 1981, now abandoned which is a continuation of Ser. No. 017,042, Mar. 2, 1979, now abandoned.

BACKGROUND OF THE INVENTION

The present invention relates to digital data communications and in particular to a system for the in-service evaluation and assessment of such digital data communications without interfering with or interrupting data traffic.

Digital data is commonly communicated from station to station over a network comprising two or more stations. Some form of data terminal is provided at each station and at least one station includes a transmitter with a receiver located at another station. The transmitter and receiver are connected to their associated terminals and interconnected by a suitable communications channel or media.

At present, communications equipment (i.e., the transmitters and receivers) comprise digital modems for high speed digital data transmission. Communications channels may comprise dedicated or dial-up voice-grade telephone links including PCM, carrier, satellite and cable elements.

Data communication networks of the type described above have been utilized for some time. Fault recognition and isolation has long been recognized as a very desirable feature for such systems and has found wide application, particularly in the military where system integrity is of primary importance and costs are of secondary importance. Heretofore, however, performance monitoring has been primarily on an out-of-service basis with only limited in-service monitoring. That is, in order to determine the quality of the components of the network, the network had to be taken out of service to permit a series of analytical tests to be performed. As a result, only limited knowledge of the conditions and parameters of the overall network could be ascertained. Certain communications channel impairments, for example, signal to noise ratio, phase jitter, etc., could not heretofore be determined without interfering with data flow.

In order to gather information on channel impairments such as signal to noise ratio, phase jitter, etc., a communication media had to be taken out of service thus interrupting user data traffic. This is highly undesirable. In addition, channel degradations which did not cause an actual loss of data traffic could not be detected since taking the channel out of service for periodic testing was not justified if the channel had not degraded to the point where data traffic was interfered with. As a result, no means have heretofore been available to determine potential future failures which, if detected, would have permitted preventative action to be taken to avoid the actual failures.

Another problem which has heretofore been encountered is that once a failure or degradation occurs, it is not readily apparent at which point in the overall network the problem occurred. That is, in many instances the same interruption in data transmission would occur if the fault appeared in any one of the data terminals, communications equipment or communications media.

In view of the above, it is the principal object of the present invention to provide an improved data communications network in which performance can be measured and evaluated in-service, on a non-interfering basis.

A further object is to provide such a system in which faults can be isolated and assigned to the particular system component in which they occur.

A still further object is to provide such a system which utilizes basically conventional components without requiring any radical reconfiguration.

Still another object is to provide a system capable of quantitatively analyzing the performance of all the elements of the network.

A still further object is to provide a system which can be utilized with all types of data transmission systems which utilize quadrature modulation including PSK, combined amplitude and phase modulation, amplitude or phase modulation.

Still other objects and advantages will be apparent from the following detailed description of a preferred embodiment of the invention.

SUMMARY OF THE INVENTION

The above and other beneficial objects and advantages are attained in accordance with the present invention by providing a data communications system comprising receive and transmit communications equipment which utilize some form of quadrature modulation; data terminal equipment at each communications equipment location; a communications media interconnecting the communications equipment; and, auxiliary signal processing equipment at each communications equipment location and interfaced with the communications equipment. The interfacing consists of a high speed data transfer interface as well as slow speed digital and analog interfaces.

The auxiliary signal processing equipment is able to extract signals from the communication equipment indicative of the status or condition of the communications equipment and to control timing and data signals between the communications equipment and data terminal equipment to determine, on a presumptive basis, the status of the data terminal equipment. The auxiliary processing equipment also analyzes eye diagram pattern scatter to determine the condition of the communications media. The performance of the entire system may thus be quantitatively assessed on a non-interfering basis. Faults, malfunctions and system degradation may be isolated to a particular element of the network. Further, if the communications equipment lends itself to reconfiguration, the auxiliary processing equipment may also serve to reconfigure the communications equipment to compensate for degraded conditions either actual or anticipated.

DETAILED DESCRIPTION OF THE PREFERRED EMBODIMENT

Figure 1:
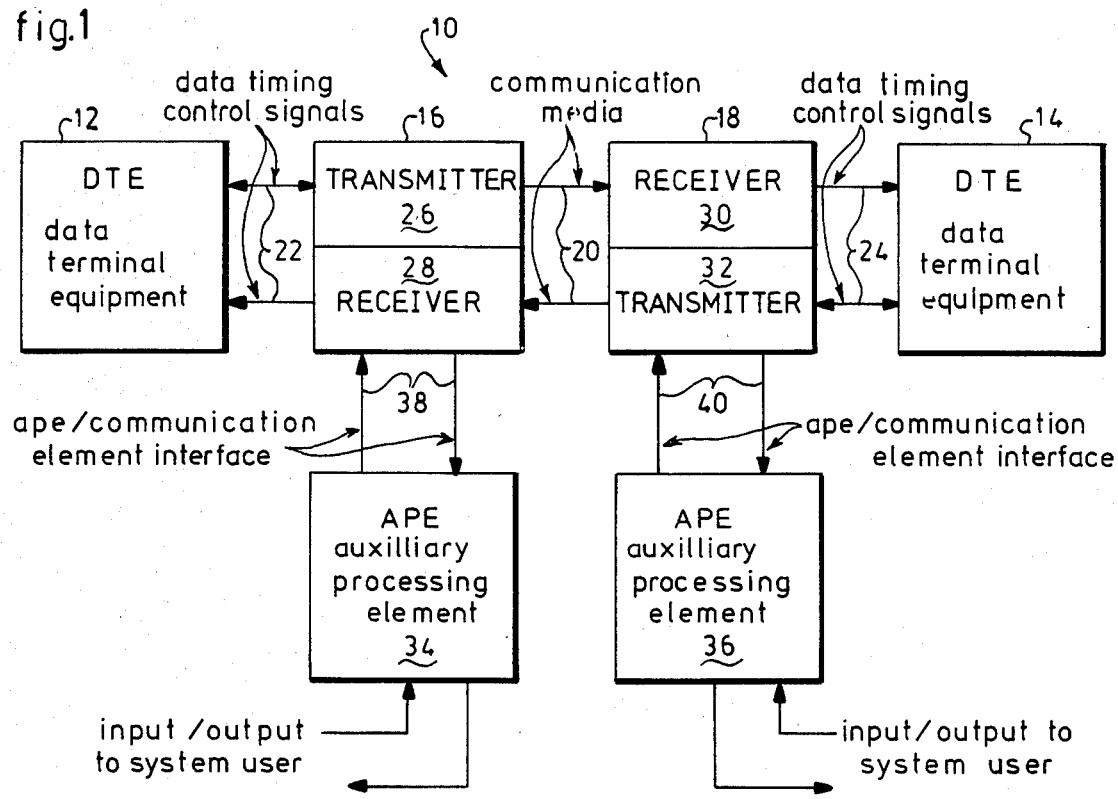
FIG. 1 is a block diagram of a two-station data communications network in accordance with the present invention.

Reference is now made to the drawings and to FIG. 1 in particular wherein a simplified two-station data communications network 10 is depicted comprising a pair of data terminals, 12 and 14, located at sites remote from each other. Communications equipment in the form of transmit/receive modems 16 and 18 are located one at each site and each is connected with one of the data terminals and a communications media 20 which interconnects the modems.

The data terminals 12 and 14 need not be identical (and usually are not) and could comprise any combination of a central processor, data concentrator, line printers, CRT, etc. The data terminals supply data to and accept data from their associated communications equipment. This is accomplished through lines 22 and 24 which, in addition to data, also carry timing and control signal information. Signals between the data terminals and their communications equipment is usually specified in Electronics Industries Assocation Standard RS-232 or RS-449 or CCITT recommendation V.24.

The communications equipment 16 and 18 comprises modems which may be implemented by means of LSI technology or microcomputer technology. The former is typified by the model LSI-24, 2400 BPS modem of the Paradyne Corporation of Largo, Fla. The latter is typified by the Paradyne MP-48, 4800 BPS modem.

Modem 16 consists of a transmitter 26 and receiver 28. Similarly, modem 18 consists of a receiver 30 and transmitter 32. The transmitters 26 and 32 of modems 16 and 18 accept timing, control and data from their associated data terminals and convert them to a form suitable for transmission over the communications media. Conversely, the receivers 28 and 30 convert the received signals into digital data, clock and control signals which can be interfaced with their associated data terminal equipment.

The communications media 20 comprises a link interconnecting the location of the data terminal equipment. The link may comprise a dedicated or dialed-up voice grade telephone channel. In FIG. 1, the link 20 is depicted as being full duplex, i.e., data can be transferred in both directions simultaneously.

At each communications equipment site in the network there is also located auxiliary processing equipment (APE) 34 and 36 interfaced with the communications equipment at that site. As will be described, the APE 34 and 36 serves to access the status of the communications equipment, communications media and data terminal equipment. Accordingly, interface element 38 is interposed between APE 34 and modem 16 and interface element 40 is interposed between modem 18 and APE 36.

Figure 2:
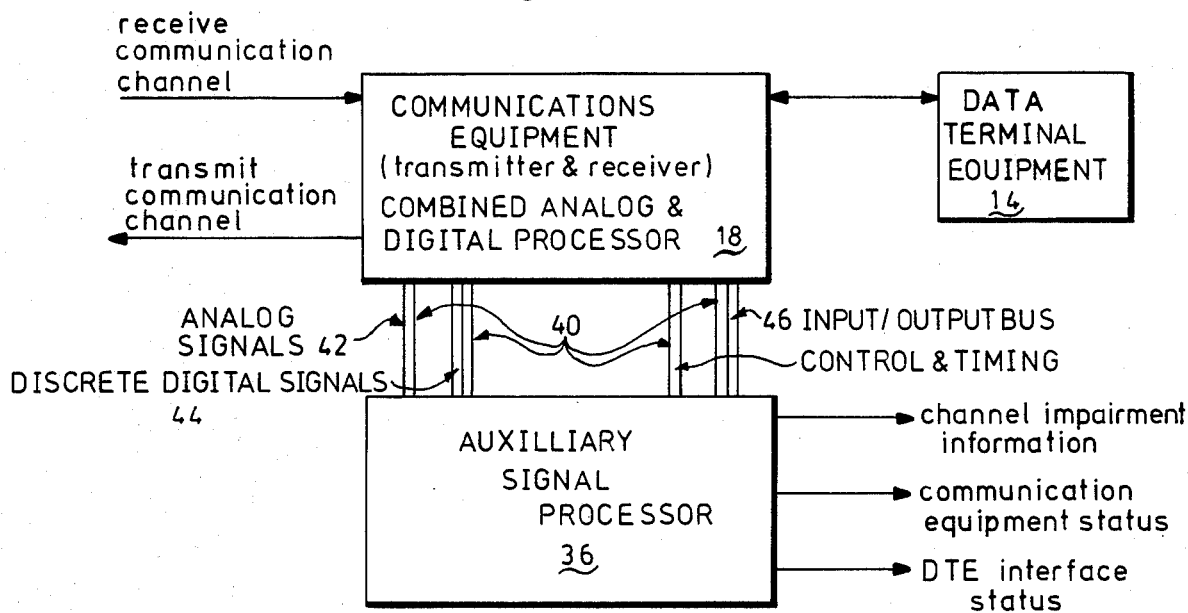
FIG. 2 is a more detailed block diagram of one of the stations of the network of FIG. 1 detailing the interface between the auxiliary processing equipment and communications equipment.

In FIG. 2, more detail of the interface element 40 between modem 18 and APE 36 is set forth. Analog signals such as the power supply and the automatic gain control (AGC) control voltage are fed to the APE for analysis through a low speed analog interface 42. Discrete digital signals are fed to and from the APE through a low speed digital interface 44. The discrete digital signals are of a wide variety and include data terminal equipment control, clock and data information before/after conversion to/from TTL levels from RS-232 levels. The discrete digital signals also include signals which may be used to control or reconfigure model 18 such as rate select, data terminal loop back enable, VF loop back enable, LSD forced off, test lamp ON, etc. A modem based on microcomputer technology such as disclosed in the previously mentioned U.S. Pat. No. 4,085,449 readily lends itself to reconfiguration in the manner described in the patent.

A further interface between modem 18 and APE 36 comprises a high speed data transfer bus 46. Bus 46 is employed to transfer samples of the complex eye pattern or signal constellation of the modem 18. The complex eye pattern is processed and analyzed in the manner described in my pending application Ser. No. 16,912, filed Mar. 2, 1979 now U.S. Pat. No. 4,381,546, for SYSTEM FOR THE QUANTITATIVE MEASUREMENT OF IMPAIRMENTS IN THE COMMUNICATION CHANNEL OF A QUADRATURE AMPLITUDE MODULATION DATA COMMUNICATION SYSTEM filed concurrently herewith. It suffices to say for the present application that such processing may be utilized to quantitatively evaluate the condition of the communications link in the manner described in the copending case.

Each baud time (1/1200 second) the X and Y values of the received eye is available for transfer in the form of two eight bit digital words. By means of the control signals, the APE 36 enables the data transfer. Timing from the modem 18 to the APE 36 enables the APE to properly check the two eight bit words into an input buffer. Given access to the classes of signals described above, the APE may then compute channel impairment information, the status of the modem 18 and the data terminal equipment interface status.

Figure 3:
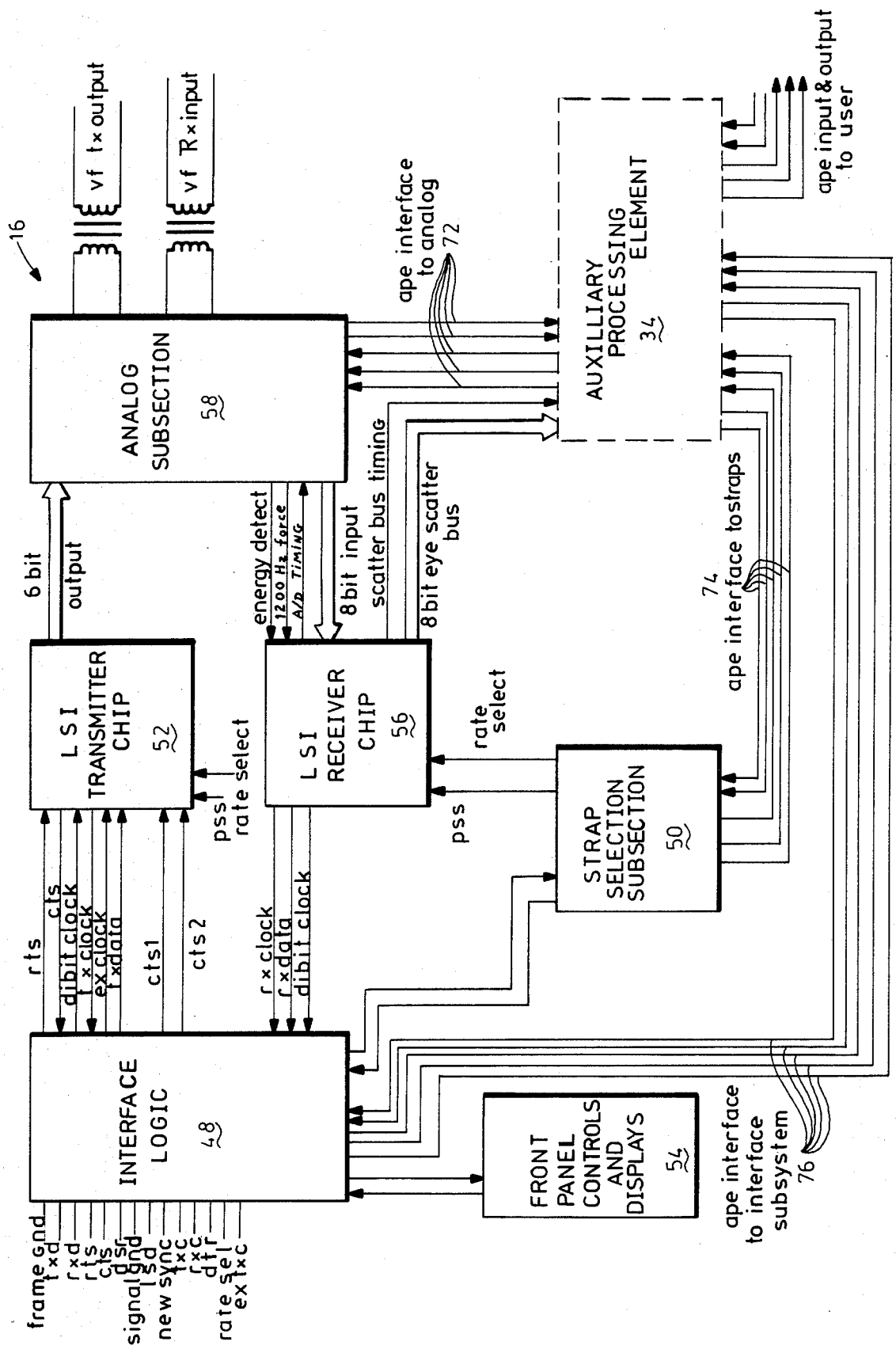
FIG. 3 is a functional block diagram of the communications equipment and interface with auxiliary processing equipment.

In FIG. 3, a modem 16 is depicted. The modem comprises a 2400 bit per second, phase shift keyed, telephone wire line modem. The function of this equipment is to permit the transfer of digital data at rates of 2400 or 1200 bits per second over nominal 3 KHz, band limited telephone type channels. The carrier frequency is 1800 Hz and the nominal data band width (Nyquist bandwidth) is 1200 Hz. The modem is synchronous and employs four phase signaling at the rate of 2400 BPS and two phase signaling at the rate of 1200 BPS. Interface logic 48 provides the interfacing between the modem and the data terminal equipment 12. Signals to and from the data terminal equipment conform to RS-232 standards and their function and characteristics are fully discussed in EIA standard RS-232-C. Another function of interface 48 is to convert the voltage levels of the data terminal equipment signals to the internal voltage levels required by the TTL logic of the modem. The interface 48 also integrates signals from the front panel controls and indicators 54 of the modem.

In order to reconfigure the modem for different applications, a strap selection subsystem 50 is provided. The interface logic also serves to integrate the strap selection subsystem into the modem. Another function of the interface logic is to convert data terminal equipment, front panel and strap signals into a form suitable for input to the LSI transmitter chip 52. The interface also accepts signals from the LSI receiver chip and converts them into a form suitable for output to the data terminal. The functions of the data terminal equipment loop back and TXRX digital loop back are provided by the interface.

The front panel control and displays 54 are those switches and indicators provided on the modem front panel. Signals displayed by means of LEDs are TXD, RXD, RTS, CTS, LSD, DTE rate, test mode and errors in test mode. Switches provided are digital loop back, analog loop back and test pattern enable. These functions are generally standard and are discussed in detail, for example, in the publication of Paradyne Corporation "LSI 2400 High Speed Modem".

The strap selections of subsystem 50 basically serves to reconfigure the mode of operation of the modem to specific different applications. Again, this is discussed in detail in the previously mentioned publication.

The LSI transmitter chip 52 provides all functions necessary to convert the input data into the PSK analog wave form suitable for transmission over the telephone channel except for the digital to analog and low pass filtering functions as discussed in more detail below. Similarly, the LSI receiver chip 56 provides all functions of data recovery from the received PSK signal except for low pass filtering, automatic gain control and analog to digital conversion. These functions are more fully discussed below.

The LSI transmitter chip 52 and receiver chip 56 are connected to an analog subsystem 58 which provides all the necessary interfacing between the transmitter digital output and the telephone channel signal and the digital signal input to the receiver chip. With regard to the transmitter functions, the digital signal from the LSI transmitter is digital to analog converted. The signal is then low pass filtered to remove high frequency components introduced by the convernsion process. Finally, the signal is supplied as a 600 ohm balanced voltage to the telephone channel. The receive portion of the analog subsystem 58 provides the following functions: the input signal from the line is low pass filtered to remove noise which is out of the data bandwidth; the filtered signals are then gain adjusted by an automatic gain control circuit to provide a constant RMS power level and the resultant signal is then converted to eight bit digital values at a sample rate of 14,400 samples per second by an A/D converter. An envelope detector circuit in this subsystem is used to extract the 1200 Hz component of the receive signal during the preamble or training portion of each transmission. The 1200 Hz is then infinitely clipped and used to force the receiver chip baud timing during the training phase. An energy detect circuit supplies the signal to the receiver chip. The signal alerts the receiver to commence a training sequence. The functions of the VF line loop back and transmitter to receiver loop back are also performed in this subsystem.

Figure 4:
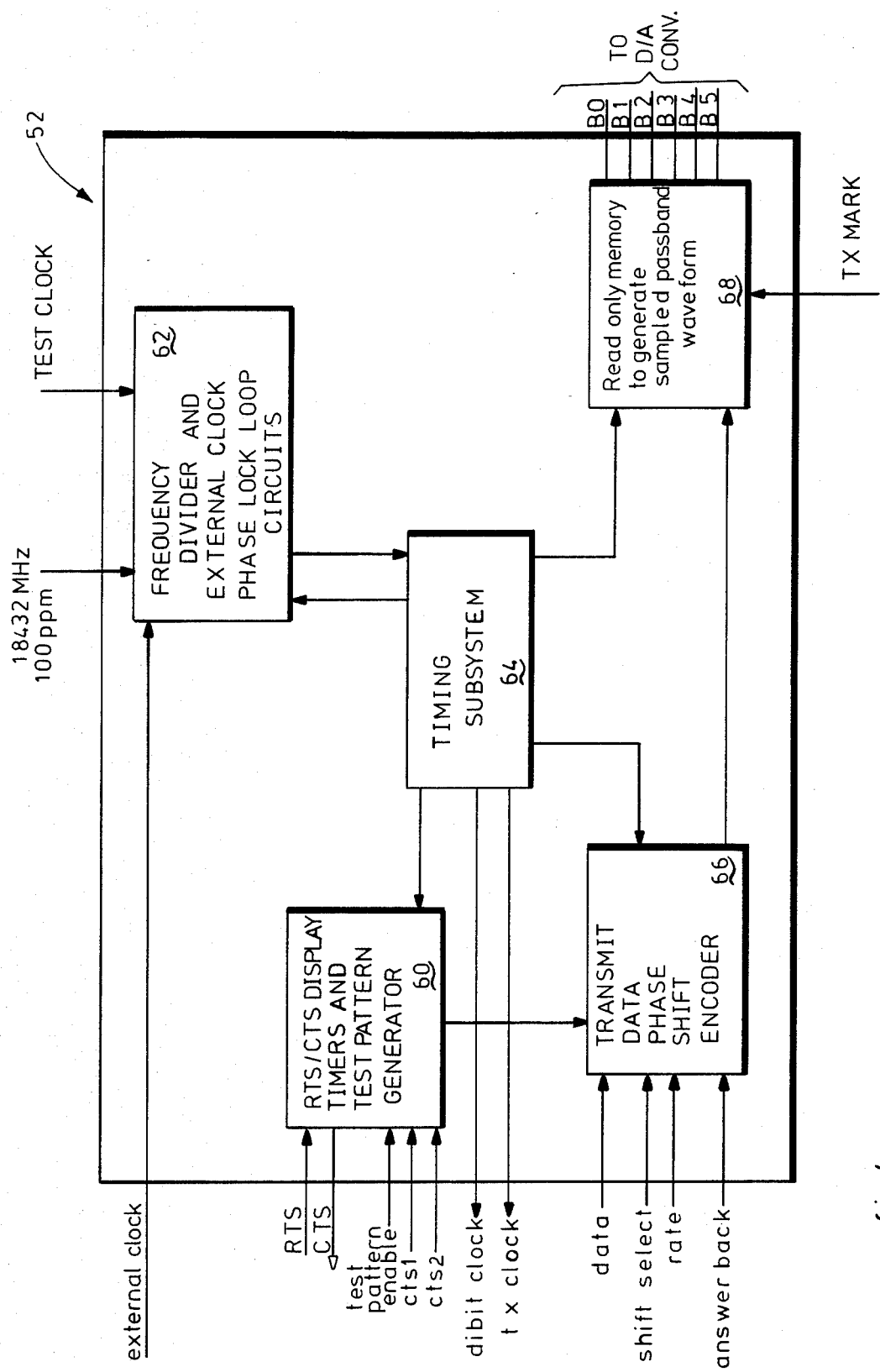
FIG. 4 is a functional block diagram of an LSI transmitter chip which may be utilized in the present invention.

The LSI transmitter chip 52 is depicted in FIG. 4. RTS/CTS delays and training sequence timing are performed by the delay timer subset 60. A frequency divider from an external oscillator 62, in conjunction with the timing subsystem 64 provides all necessary internal chip timing. Phase encoding of the data bits is performed by the data phase shift coding subsystem 66 according to the phase shift mode (0° or 45° increments) and the data rate. The actual sample values of the digital output PSK signal are generated from values stored in a read only memory 68.

Figure 5:
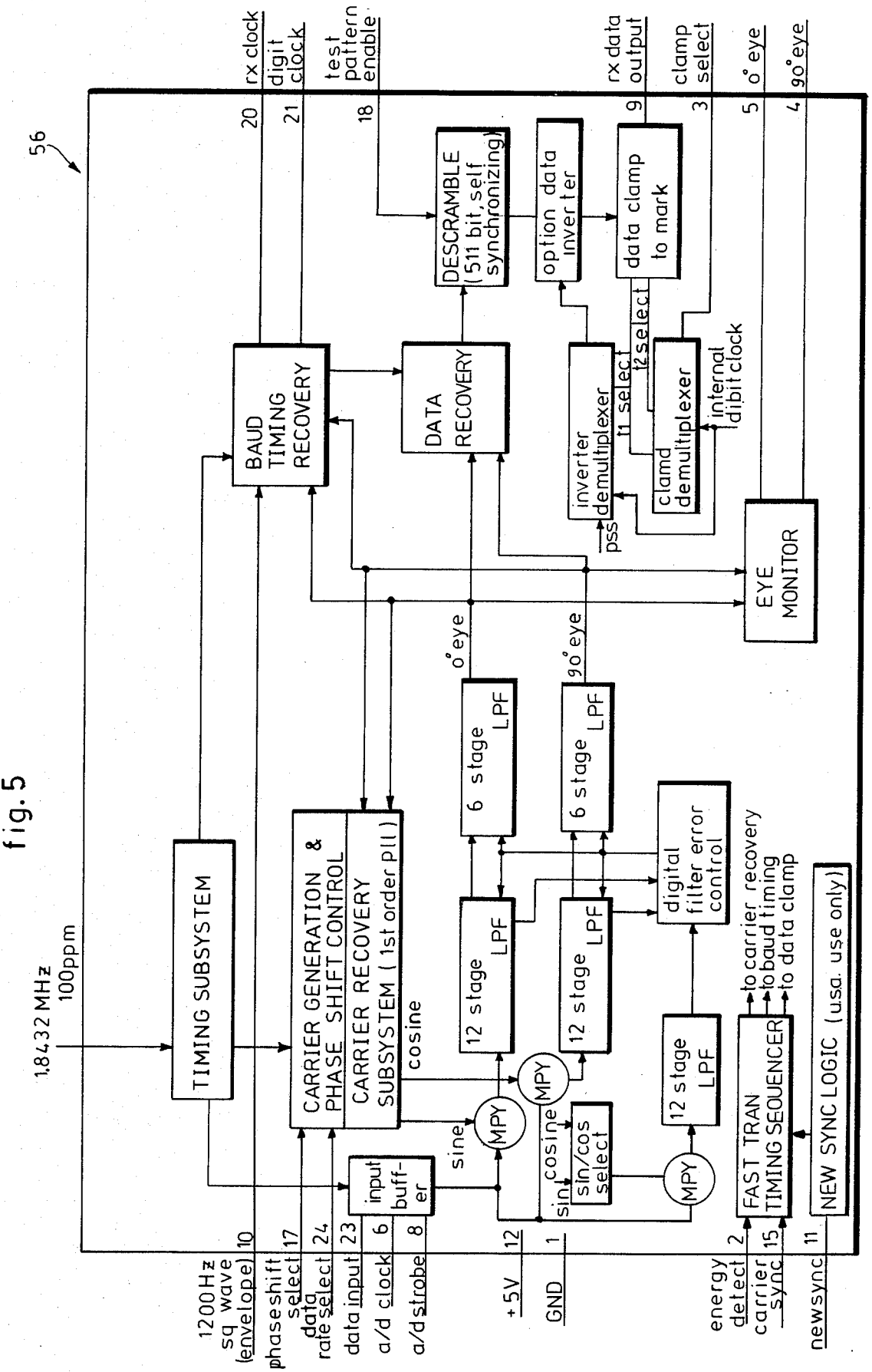
FIG. 5 is a functional block diagram of an LSI receiver chip.
Figure 6A:
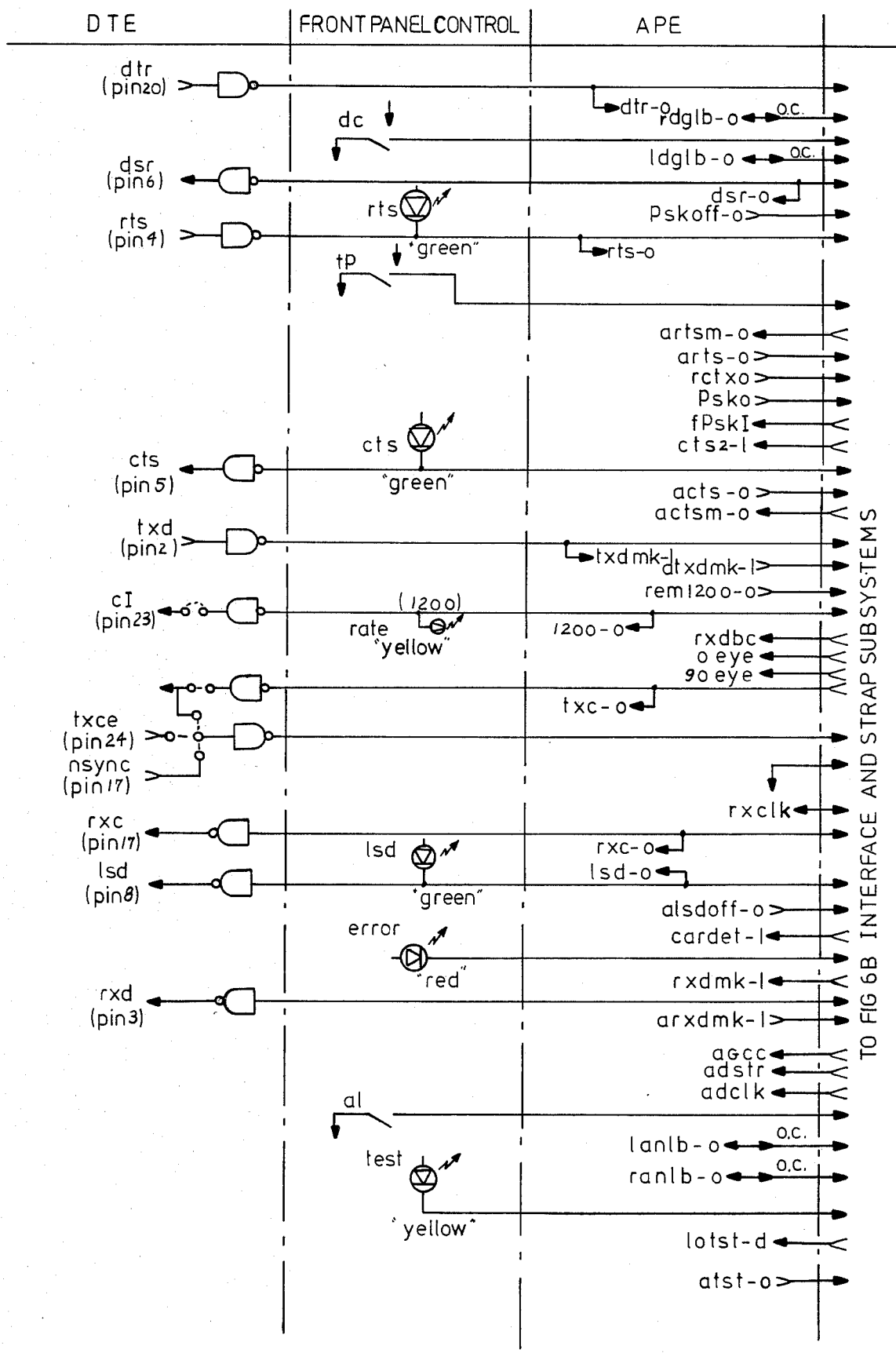
FIGS. 6A–6D is a functional schematic diagram of the electrical relationships between the various communications equipment signals and auxiliary processing equipment.
Figure 6B:
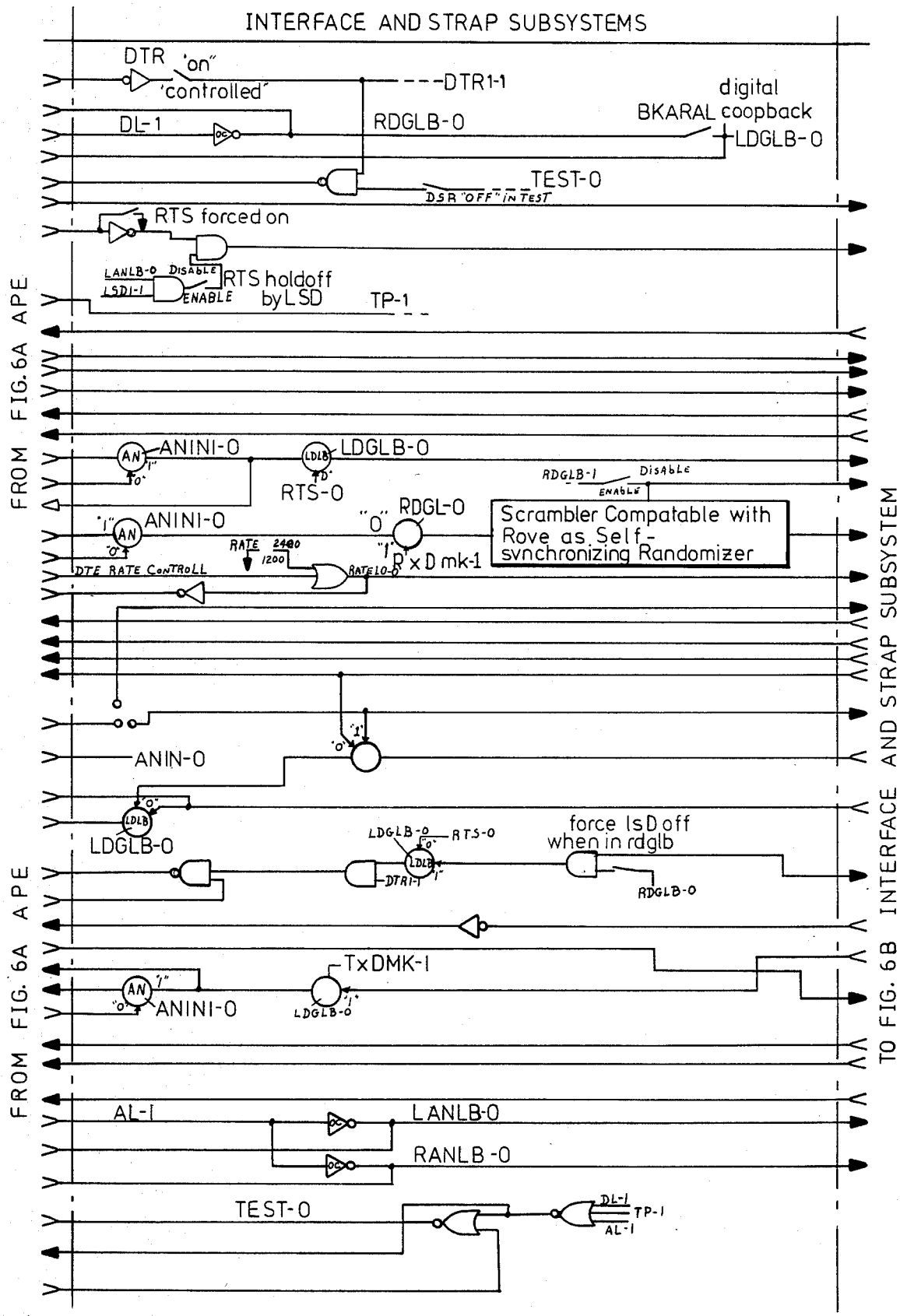
Figure 6C:
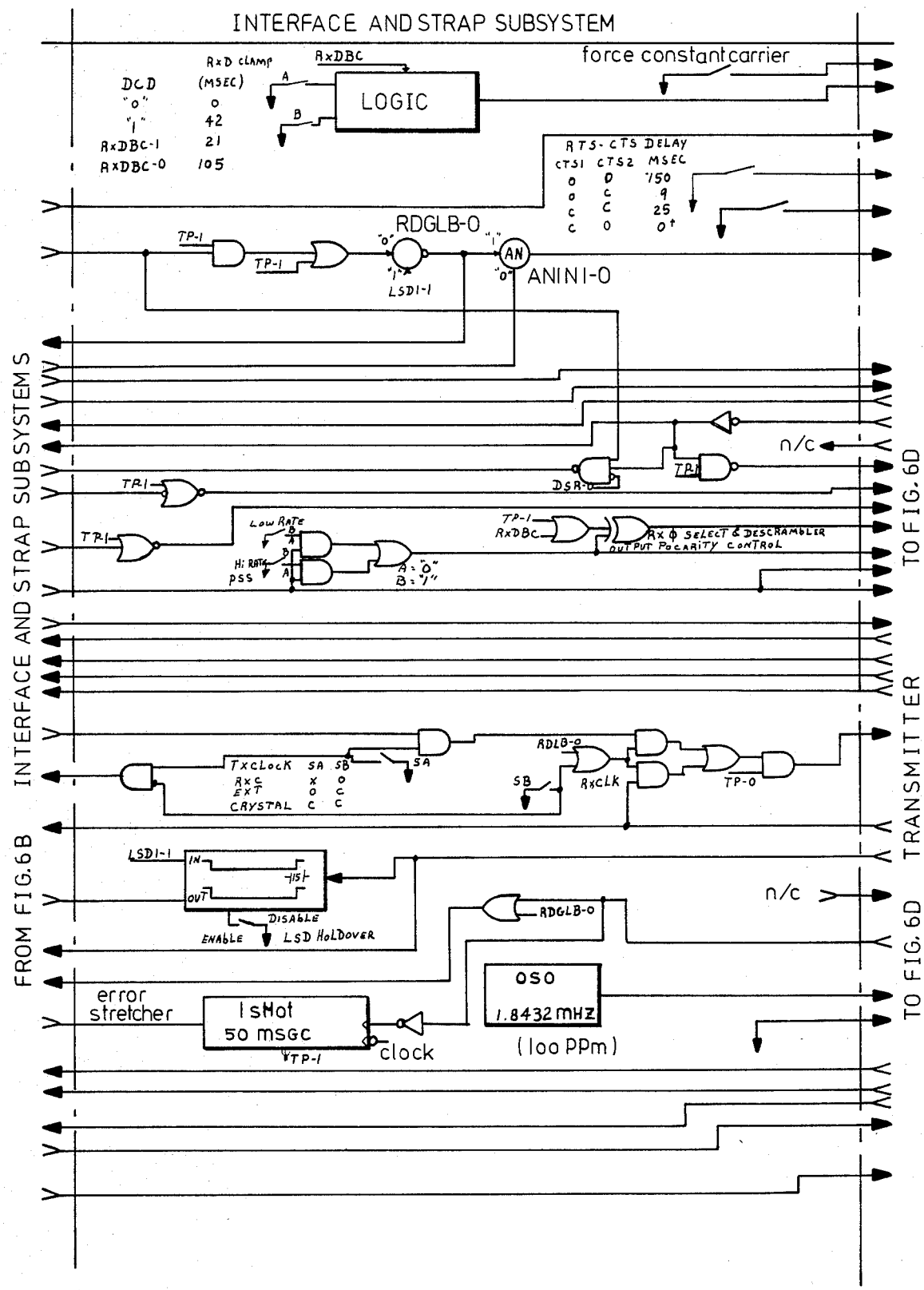
Figure 6D:
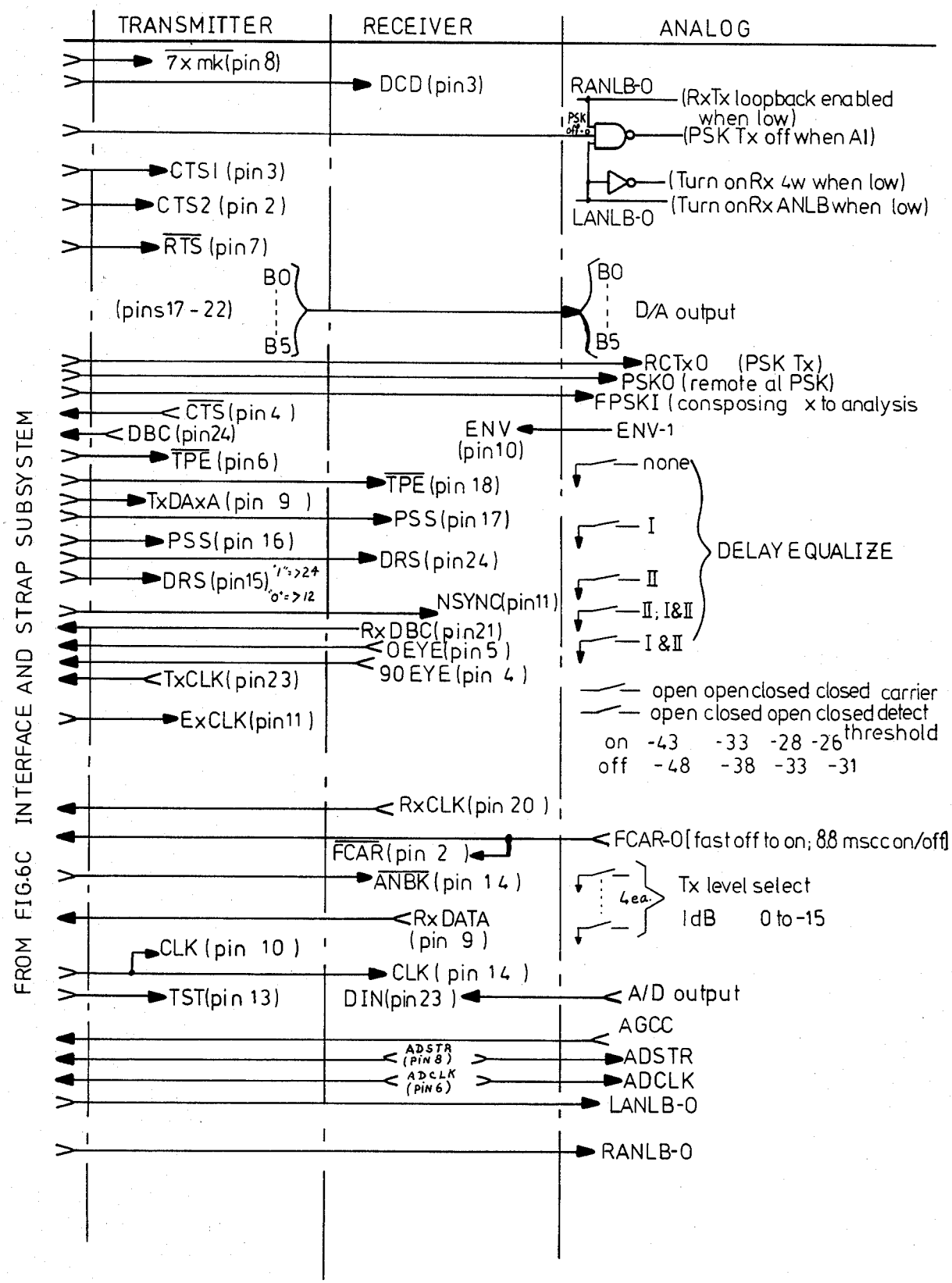

In FIG. 5, an LSI receiver chip 56 is depicted. The receiver structure is QAM as opposed to a PSK design. Operation of this type of receiver is well known in the art as typified by U.S. Pat. Nos. 3,887,768; 4,004,226; 4,035,625; and, 4,085,449.

It suffices for the present application to discuss in detail the key features of the receiver chip which relate to the present invention. First, for each baud interval or 1/1200 seconds, the sample value of the X and Y coordinates of the eye are made available to the APE from the receiver chip. As a result, channel impairments such as signal to noise ratio, phase jitter, frequency offset, phase and amplitude bits, etc. may be computed by the techniques presented in my copending application now U.S. Pat. No. 4,273,955 for SYSTEM FOR THE QUANTITATIVE MEASUREMENT OF IMPAIRMENTS IN THE COMMUNICATION CHANNEL OF A QUADRATURE AMPLITUDE MODULATION DATA COMMUNICATION SYSTEM.

Referring back to FIG. 3, it can be seen that the auxiliary processing element 70 interfaces with receiver chip 56 as well as with the analog subsection 58. From the analog subsystem interface 72 the auxiliary processing element monitors and measures the automatic gain control voltage. Since the control voltage, expressed in volts, is proportional to the receive signal level expressed in dB, the auxiliary processing element 34 may obtain the value of RSL in dB. By means of the analog subsystem interface 72, the auxiliary processing element may cause analog loop back to be initiated and may also mute or turn off the analog PSK output signal to correct a streaming transmitter. The auxiliary processing element also interfaces with the strap selection subsystem 50 through interface 74. Thus, the auxiliary processing element may both access the strap configuration of the modem or alter the modem configuration. For example, the auxiliary processing element may "speed shift" the transmitter and receiver.

The remaining major interface between the auxiliary processing element 36 and the communications equipment 18 is via the interface logic subsystem interface 76. This interface permits the auxiliary processing element 34 to monitor all the data terminal equipment interface signals as seen by the data terminal equipment. These signals may also be controlled by the auxiliary processing element for test purposes and the auxiliary processing element may simulate transmitter and receiver functions as seen by the data terminal equipment or may simulate data terminal equipment functions as seen by the communications equipment. These capabilities permit error rate test to be performed by the auxiliary processing equipment at either end of the communication channel. The front panel control and display 54 signals are also available in the interface subsystem. Thus, the auxiliary processing equipment may sense the position of all front panel controls.

In FIGS. 6A–6D, there is a functional schematic diagram of the electrical relationship of the signals between the communication equipment 16 subsystems and the auxiliary processing equipment 34. The figure is presented in normal TTL logic symbology and is self-explanatory to one skilled in the art so that no further description is required.

Figure 7:
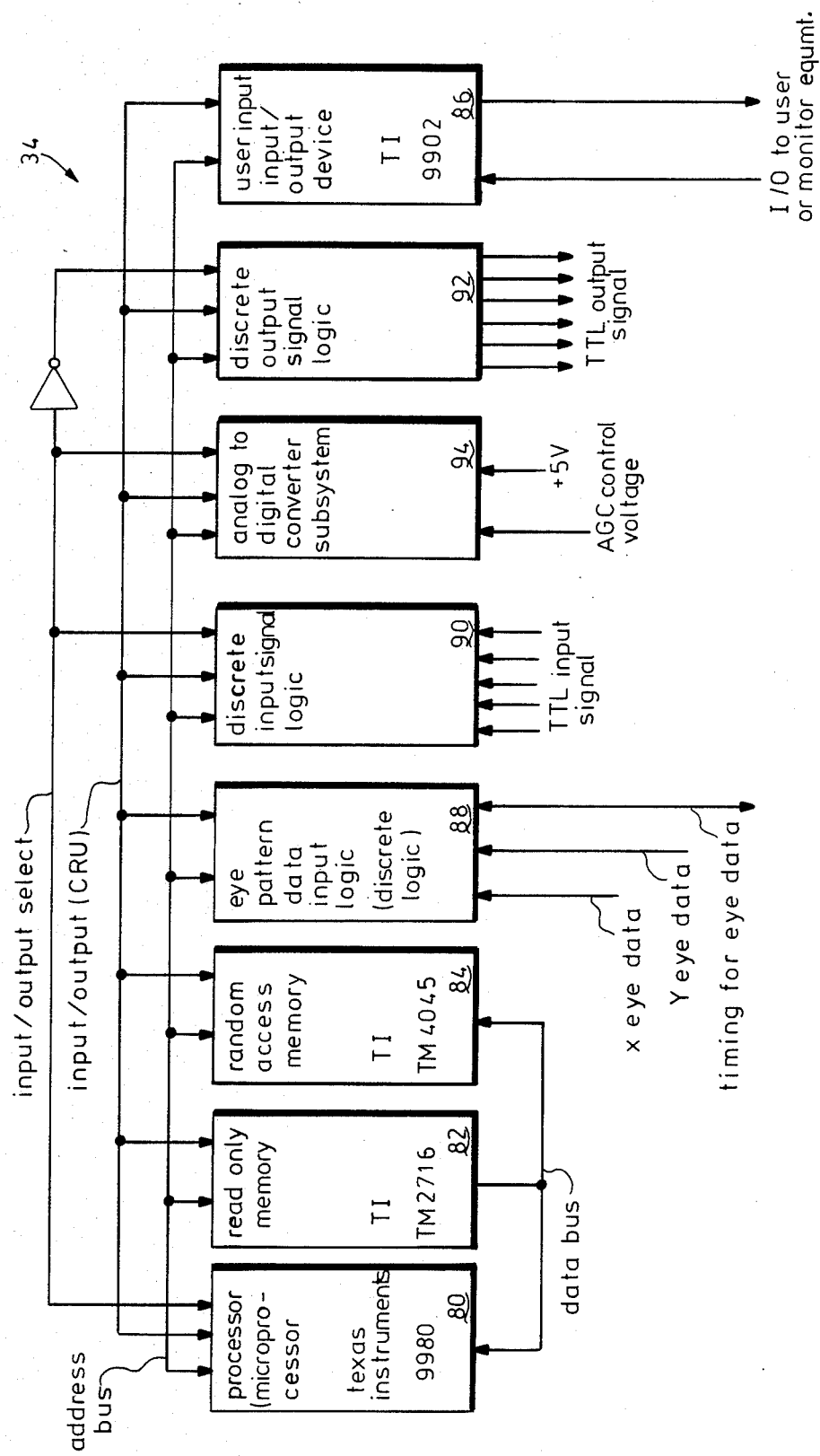
FIG. 7 is a block diagram of the auxiliary processing equipment subsystems; and, FIG. 8 is a functional flow chart of the auxiliary processing equipment to collect and process data, input commands and output results.

The auxiliary processing elements 34 and 36 are preferably microcomputer based. The subsystems of these elements which are required for the present invention are set forth in FIG. 7. The microcomputer may comprise a 9980 microprocessor 80; read only memory 82; random access memory 84; and a 9902 asynchronous input/output device 86. All the above components are available commercially from the Texas Instruments Company. Operation of the input logic 88 to accept the X and Y components of the eye pattern is fully discussed in my previously mentioned copending application.

A discrete input subsection logic subsection 90 is composed of addressable input devices such as the 74LS251. Each device is supplied three address bits which enable the device to read and output any one of eight input states. Input signals sensed by the 74LS251 are shown in FIG. 6.

The output devices employed in the output logic of subsystem 92 comprise 74LS259s. These devices are configured in a manner similar to the input devices except that all eight outputs are latched and held in a particular assigned state until readdressed. Output signals of the auxiliary processing element which are controlled by these devices are also shown in FIG. 6.

In order to read analog signals such as power supply voltage and automatic gain control (AGC) control voltage an A/D converter subsystem 94 is employed in the auxiliary processing element. This subsystem consists of a controllable analog switch to select the appropriate analog voltage for input to the A/D converter. The A/D converter is composed of a D/A converter model MC1408L-8 and up-down counter model MC14559B both of which are available from the Motorola Corporation. Depending upon which analog input is addressed and inputted to the A/D converter, the signal voltage is converted to an eight bit digital word. The word is then read by the microcomputer and stored for subsequent processing.

Figure 8:
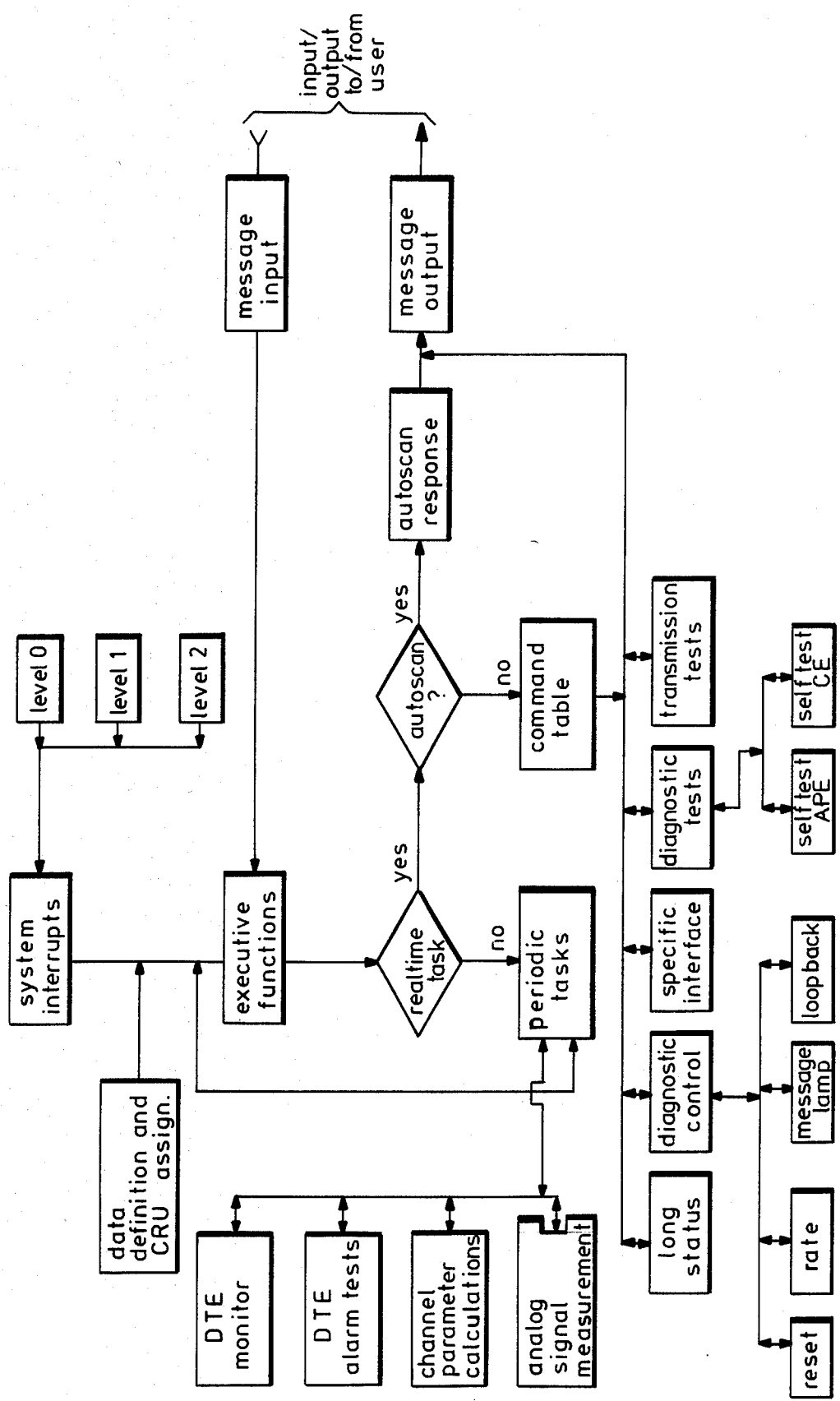

In FIG. 8 a functional flow chart of the software required by the auxiliary processing equipment to collect and process data, input commands and output results, is presented. The software operates under control of an executive which reads to, interrupts and coordinates the transfer of subtasks to software subroutines. The executive had three levels of interrupts. In descending order, they are: priority 1 which consists of power on and dead man timer; priority 2 which consists of the processing of transmitted and received data in transmission bit error rate test (essentially a real time processing function) and priority 3 which consists of processing clocks for activity.

Input messages from the user or an external control are processed by the executive. If they are a real time task and are of the auto scan class of messages, the response is formatted by the executive and output to the user or external controller. If the message is a real time task and not of the auto scan class, the message must be a command to the auxiliary processing equipment. The command table then transfers control from the command message to the proper command processing task routine. The command processing routines are long status, diagnostic control, specific interface, diagnostic test and transmission test. Subtests under control of the diagnostic control task are reset APE and CE, shift CE data rate, light or turn-off the "message" lamp or execute one of the four available loop backs. Subtasks of the diagnostic tests are self-tests the CE or self-test the APE. If the periodic task is not a real time task, it is one of the background tasks performed by the APE. These tasks are periodically performed by the APE if input/output to the user or external controller are not being processed. The periodic tasks are: (1) check status of the data terminal equipment signals; (2) check the data terminal equipment signal acitivity against alarm limits and alarm if required; (3) compute channel impairment parameters such as signal to noise ratio, phase jitter, frequency offset; and (4) measure communications equipment power supply voltage and receive signal level.

Thus, in accordance with the above, the aforementioned objects and advantages are effectively attained. While the present invention has been set forth in a specific embodiment, it should be realized that the scope of the invention is more general than the specific embodiment and is as set forth in the following claims.

Having thus described the invention, what is claimed is:

1. In a data communication network for exchanging quadrature amplitude modulated signals between two first and second data communication equipment over a communication channel at least one of said first and second data communication equipment having an auxiliary processing equipment comprising:

eye pattern means for receiving eye pattern signals corresponding to said quadrature amplitude modulated signals;

digital input means for receiving digital control signals from the corresponding digital communication equipment;

analog input means for receiving analog signals from the corresponding digital communication equipment;

signal processing means for analyzing and processing signals from said eye pattern means, digital input means, and analog input means and adapted to generate output signals indicative of the status of said data communication network; and output means for selectively transmitting said output signals.

2. The network in accordance with claim 1 wherein said auxiliary processing equipment is interfaced by means of a digital interface.

3. The network in accordance with claim 2 wherein said digital interface includes a high speed data bus.

4. The network in accordance with claim 3 wherein said network further includes an analog interface.

5. The network in accordance with claim 2 wherein said network further includes an analog interface.

* * * * *